Dec. 31, 1963   N. D. EAGON ETAL   3,115,812
ATTACH AND RELEASE MECHANISM
Filed April 26, 1962   4 Sheets-Sheet 1

INVENTORS
NORTON D. EAGON
KENNETH O. McREE
BY Claude Funkhouser
Franklin J. Visk
ATTORNEYS

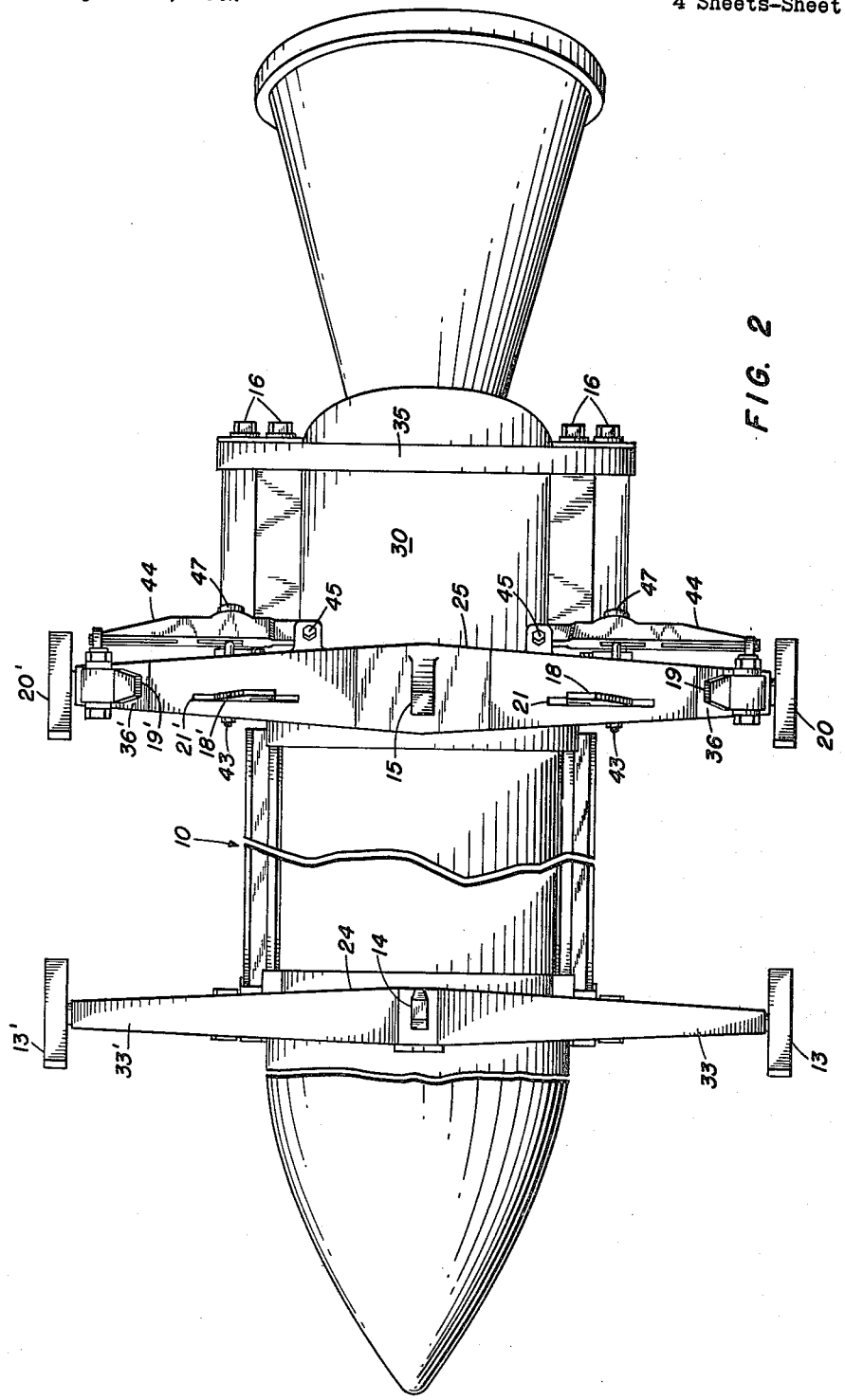

Dec. 31, 1963    N. D. EAGON ETAL    3,115,812
ATTACH AND RELEASE MECHANISM
Filed April 26, 1962    4 Sheets-Sheet 3

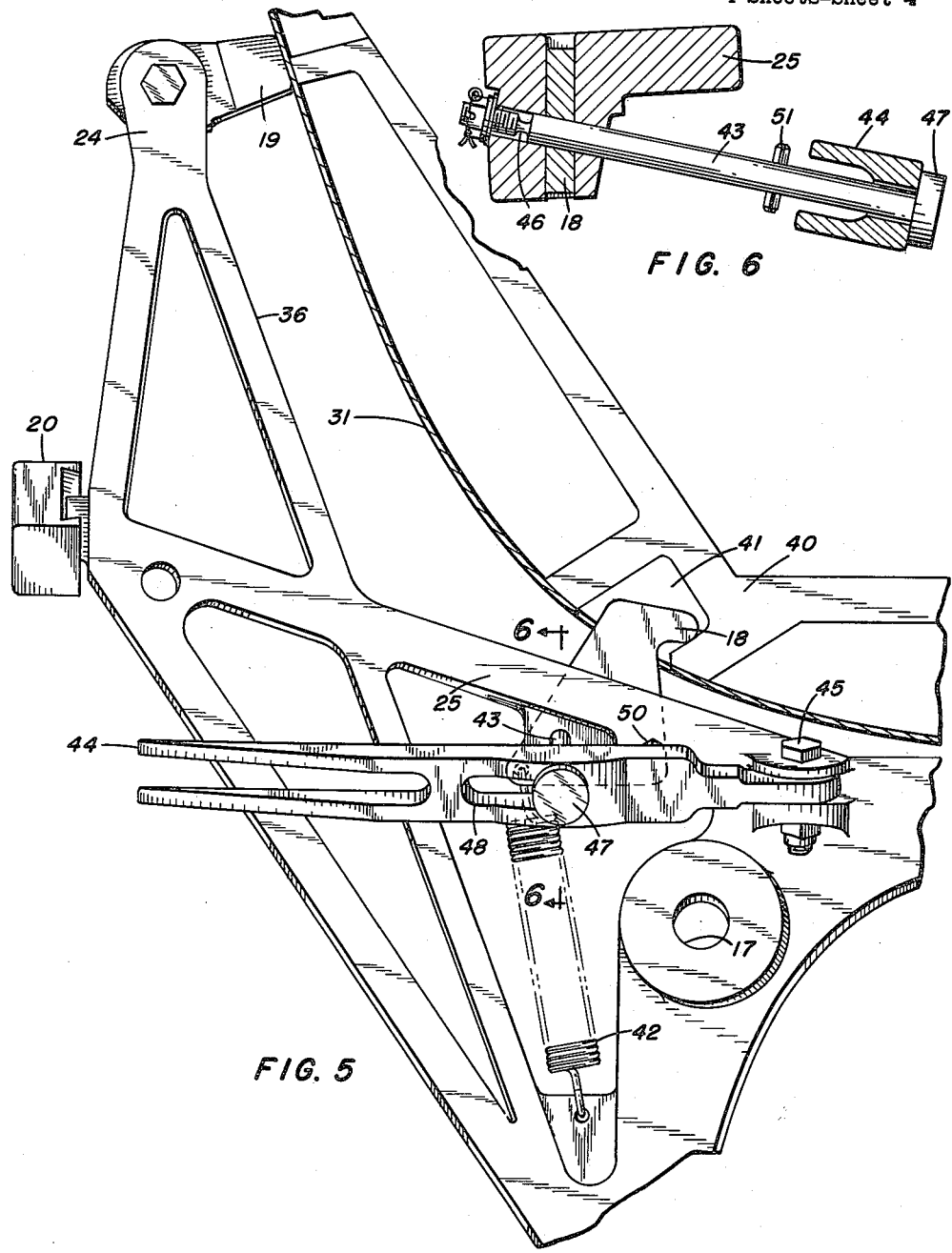

United States Patent Office 3,115,812
Patented Dec. 31, 1963

3,115,812
ATTACH AND RELEASE MECHANISM
Norton D. Eagon, Grand Prairie, and Kenneth O. McRee, Dallas, Tex., assignors, by mesne assignments, to the United States of America as represented by the Secretary of the Navy
Filed Apr. 26, 1962, Ser. No. 190,507
9 Claims. (Cl. 89—1.7)

This invention relates to an attach and release mechanism and more specifically to an attach and release mechanism for the attachment of a rocket booster to a missile adapted to be fired from a launcher with provisions for automatically releasing the booster and attaching cradle from the missile following launch.

A problem of prime importance when launching a pilotless aircraft is the separation of boosters after the propulsive force thereof has been expended. Such separations must, of course, be effectuated without causing any effect upon the flight path of the pilotless aircraft. This invention avoids this problem by providing for automatic separation of a booster from a missile. This separation occurs in this invention by the mere effects of gravity and disparity of velocities between the missile and the booster after termination of propulsion.

The attach and release mechanism of this invention incorporates a mechanism for breaking, during launch, pins which fixedly fasten a booster and cradle to a missile. The invention insures, however, proper operating cooperation between the booster and missile until booster thrust is expended. Thus, as thrust terminates the booster and cradle are allowed, because of the broken pins, to separate from the missile by gravitational forces since the speed of the cradle and booster will readily decrease below that of the missile.

Accordingly it is an object of the present invention to provide an attach and release mechanism capable of causing separation of two articles by gravitational forces and by means of the disparities of the velocities thereof.

Another object is to provide an attach and release mechanism for a missile-booster combination capable of automatically causing separation of the booster from the missile by mere natural forces.

A further object of the invention is the provision of an attach and release mechanism capable of fixedly supporting a missile-booster combination up to the moment of launch at which time the propulsive forces and the attach and release mechanism cooperate for maintaining the missile and booster in cooperating positions until the booster thrust subsides thereby initiating separation of the booster from the missile because of the lowered booster velocity and gravitational forces thereon.

Other objects and many of the attendant advantages of this invention will be readily appreciated as the same becomes better understood by reference to the following detailed description when considered in connection with the accompanying drawings wherein:

FIG. 2 is a top view of the attack and release mechanism of the invention;

FIG. 5 is a partial rear view of the aft portion of the attach and release mechanism of the invention taken along line 5—5 of FIG. 3; and FIG. 6 is a sectional view of the breakaway pin section on the aft portion of the attach and release mechanism of the invention taken along line 6—6 of FIG. 5.

Figure 1:
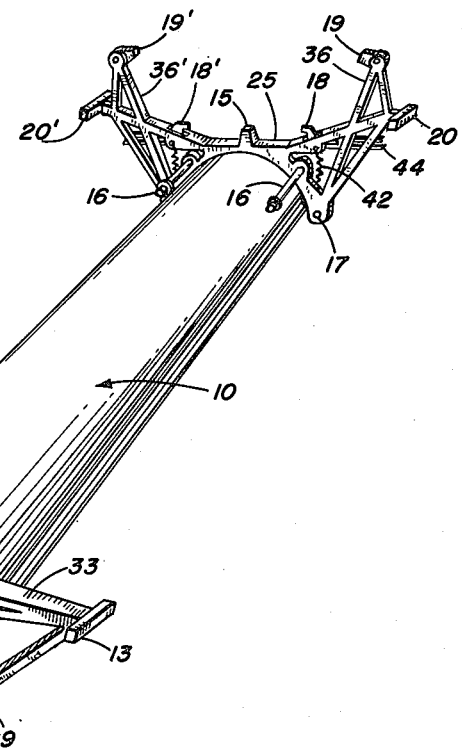
FIG. 1 is a perspective view of the attach and release mechanism of the invention.

Referring now to the drawings wherein like reference characteristics designate like or corresponding parts throughout the several views there is shown in FIG. 1 a cradle 10 having a forward attachment frame 24 and a rear attachment frame 25.

Figure 4:
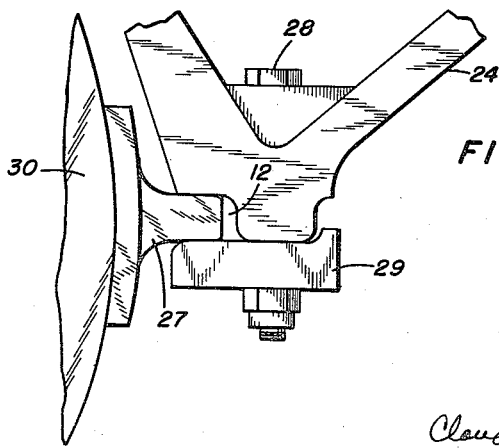
FIG. 4 is a partial front view illustrating the support of the booster by the attach and release mechanism of the invention taken along line 4—4 of FIG. 3.

Forward attachment frame 24 employs a forwardly facing hook 14 at its apex which is inserted into a recess of missile 31 to latch onto a missile hook plate 26. The lower portions of the forward frame 24 are clamped on opposite sides to flanges such as flange 27 which, as best seen in FIG. 4, project from each side of the booster 30 into keys 12 and 12'. Flange 27 is fixedly positioned into keys 12 and 12' by means of bolts 28 between a plate 29 and the lower portion of the forward frame 24. Of course, the booster also employs a flange member to fit into key 11 of the cradle. Forward frame 24 also employs transversely extending arms 33 and 33' on the ends of which are pivotally mounted slipper fittings 13 and 13' which ride on the launcher rails (not shown).

Figure 3:
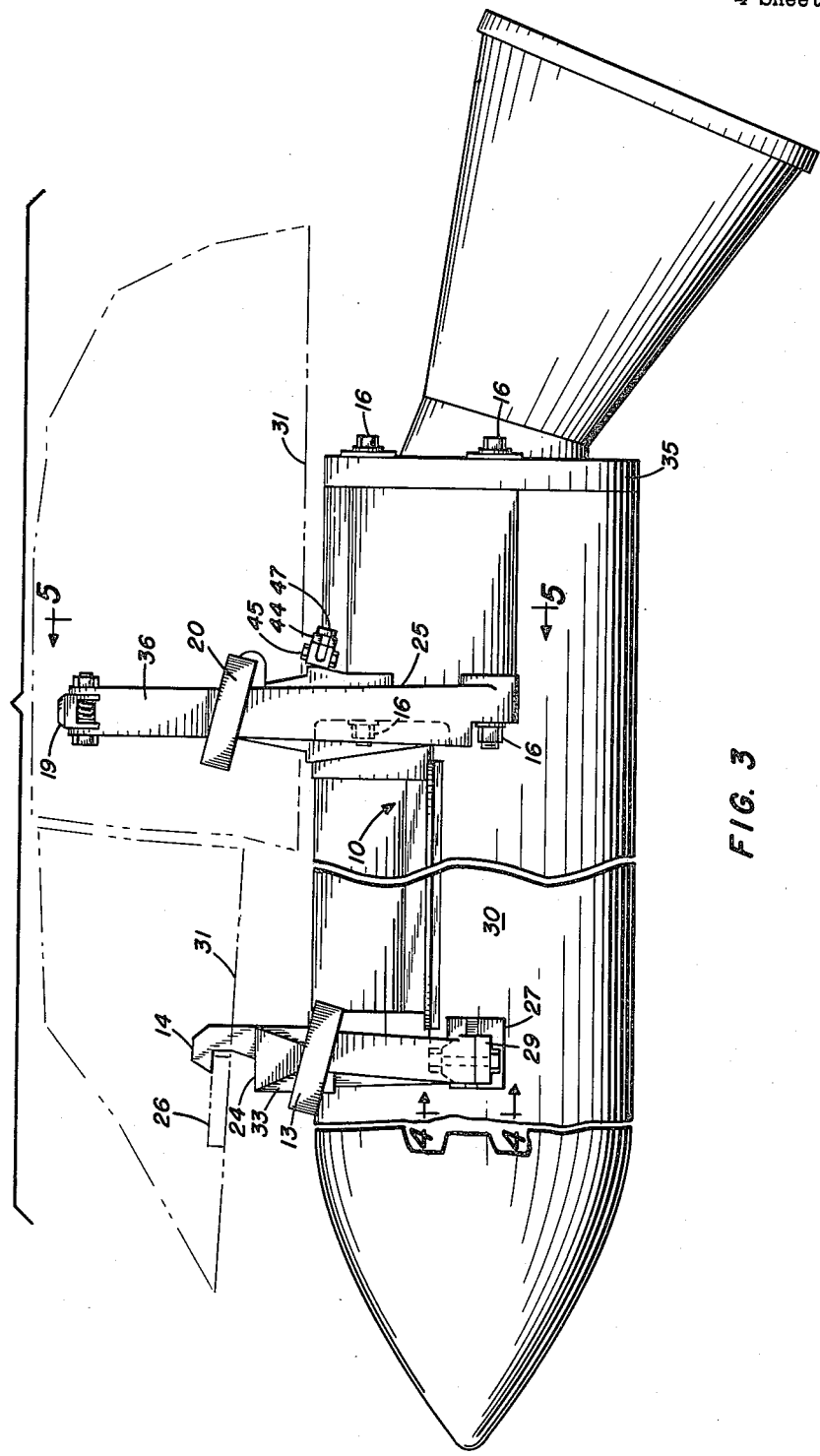
FIG. 3 is a side view of the attach and release mechanism of the invention.

As best seen in FIGS. 1 to 3 the aft attachment frame 25 is rigidly secured to a flange 35 on booster 30 by means of bolts 16 extending through said flange 35 and through bores 17 in the aft attachment frame. Additionally, the aft frame 25 employs upwardly extending arms 36 and 36' on which are mounted missile pads or cushions 19 and 19' which resiliently allow the missile fuselage 31 to rest thereagainst.

Mounted on opposite sides of frame 25 are slipper fittings 20 and 20' which ride on the launcher rail (not shown) as do the forward slipper fittings 13 and 13'.

The aft attachment frame 25 pivotally carries on opposite sides thereof inwardly facing hooks 18 and 18' which extend upward out of the frame 25 through slots 21 and 21'. These hooks 18 and 18' latch to suitable structural members 40 of the missile 31 through a recess 41 in the missile fuselage. Connected to the pivotal hooks is a spring member 42 for biasing the hook 18 toward an unlatched position out of recess 41. Hook 18 is, however, maintained in a latched or locked position by shear pin 43 which extends through the frame 25 and hook 18. The end of shear pin 43, as best seen in FIG. 6, is mounted through a slot 48 of an arm 44 and employs a head 47 for engagement with the surface of the arm 44. The arm 44 with the shear pin 43 mounted at its mid-section extends outwardly from its inboard end at which it is pivotally secured on aft frame 25 by a bolt 45 through a tongue and groove hinge. Inserted transversely through shear pin 43 is a slotted spring pin 51 for limiting the travel of arm 44 on the shear pin 43. Of course, as is best seen in FIG. 5, the locking hook 18 is pivotally secured into slot 21 by a bolt 50.

During the launching procedure it can be clearly understood from the above that the cradle body member interconnecting the forward attaching frame 24 and the aft attaching frame 25 supports the booster 30 and missile 31 in a launching rail by the forward slipper fittings 13 and 13' and the aft slipper fittings 20 and 20'. While the booster is fixedly connected in keys 12 and 12' of forward attaching frame 24 by the engagement of flanges 27 and by the aft flange 35 being secured by bolts 16 to the aft attaching frame 25, it can be clearly seen that only one fixed connection is made between the attach and release mechanism of the invention and the missile. That is, the hook members 18 and 18' extending through slots 21 and 21', respectively, are fixedly locked by shear pins against locking recesses such as locking recess 41 in the aft portion of the missile. The hook 14 of the forward attachment frame 24 is merely pivotally engaged with the missile hook plate 26. Thus, during launch, the outboard ends of arms 44 strike against striker blocks (not shown) on the launcher, thereby breaking a shear pin 43 associated with each arm at shear point 46 and subsequently withdrawing the shear pins. When the shear pins are withdrawn, springs such as spring 42 bias the latchs into an unlocked position thereby disengaging the only fixed connection of the attach and release mechanism and booster to the missile. The forward and aft attachment frames of the cradle, however, maintain positive contact with both the booster and the missile as long as the thrust of the booster is greater than the thrust of the missile. As aerodynamic drag increases on the booster, subsequent to its termination of thrust, gravity and the disparity of velocities between the missile and the booster cause the booster assembly along with the attachment and release mechanism of the invention which is fixedly connected thereto to fall free of the aft end of the missile. This action pivotally and automatically disengages the hook 14 of the forward attachment frame from the missile and the missile and booster assembly separate completely. The aft frame 25, as may be clearly seen in FIGS. 1 and 3, employs a protuberance 15. This protuberance which is inserted in a missile recess is, however, merely employed to insure against rotational movement of the missile about its longitudinal axis.

Obviously many modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. An attach and release mechanism for the separation of a booster from a missile subsequent to termination of booster thrust comprising an arcuate body member, said arcuate body member snugly engaging said booster and having a forward frame member and an aft frame member carried thereby, first booster attachment means for attaching said forward frame member to a forward portion of said booster, said first booster attachment including a plurality of grooves on the forward frame member and cooperating with flange means on the booster and clamping means secured to the forward frame member in engagement with the flange means, second booster attachment means for attaching said aft frame member to said booster, said second booster attachment means including a flange on said booster at the aft end thereof, a pair of arcuate members carried by said flange in engagement with and disposed on the booster in opposition with respect to each other, and a plurality of bolts extending through said arcuate member and secured to said aft frame member, hook means integral with said forward frame member for hooking to a missile at its forward portion to said forward frame member, locking means for fixedly connecting said aft frame member to said missile, a breakaway mechanism for disengaging said locking means from said missile, and slidable shoes pivotally connected to said forward and aft frame members for supporting said missile and booster and for slidably engaging track guides in a launcher whereby said body member and said booster are disengaged from said missile at launch to thereby allow gravitational forces to separate said aft frame member from said missile after termination of booster thrust to cause pivotal disengagement of said hook means from said forward portion of said missile.

2. An attach and release mechanism as claimed in claim 1 wherein said locking means comprises a normally locked flat latch plate pivotally connected to said aft frame member and having an opening extending therethrough and shear pin means disposed within said opening for releasably maintaining said latch means in a locked pivotal position.

3. An attach and release mechanism as claimed in claim 2 wherein said breakaway mechanism comprises arm means engaged at its mid-section to said shear pin means and being pivotally mounted at one end with the free end thereof responsive to a sudden force for shearing and withdrawing said shear pin means from engagement with the opening in said latch plate in response to said force exerted on said free end, and a spring means for moving said latch plate to an unlocked position whereby said aft frame member is disengaged from said missile.

4. An attach and release mechanism as claimed in claim 3 wherein said latch plate, said shear pin means, said arm means, and said spring means comprise respectively two pivotally mounted hooked latches inwardly facing at opposite sides of said missile in locking engagement therewith, and duplicate shear pin means for maintaining the hooked latches in locking engagement with the missile, outwardly extending arm means engaged by said shear pin means, for shearing said shear pin means and disengaging said shear pin means from said opening in response to said force exerted thereto for unlocking said hooked latches from opposite sides of said missile during a launching operation, whereupon the spring means moves the hooked latches out of locking engagement with said opposite sides of the missile.

5. An attach and release mechanism as claimed in claim 4 wherein said first booster attachment means comprises forward flange members on said booster, contractable key slots on said forward frame member for engaging said flange member on the booster, and plate means secured to the forward frame member in engagement with said flange members.

6. An attach and release mechanism as claimed in claim 5 wherein said second booster attachment means comprises an aft flange member on said booster and bolting means carried by said aft flange member and engaging said aft frame member for securing said booster to said aft frame member.

7. An attach and release mechanism for the separation of articles subsequent to the termination of cooperation therebetween comprising an arcuate body member, said arcuate body snugly engaging and supported on a first article and having a forward frame member and an aft frame member carried thereby, means including key slots carried by said forward frame member, flange means carried by said first article and cooperating with said key slots for releasably attaching said first article to the forward frame, hook means on said forward frame member and cooperating with complementary means on a second article for releasably attaching the second article to said forward frame member, second means carried by said first article and secured to said aft frame member for fixedly connecting the first article to the aft frame member, locking means pivotally mounted on the aft frame member for releasably locking the second article thereto, breakaway means pivotally mounted on the aft frame member at one end thereof and movable in response to a predetermined force applied to the free end thereof, a shearable element connected to said breakaway means and extending through the locking means and secured to the aft member for maintaining the locking means in locking engagement with the second article, said shearable element being sheared by the breakaway means to release the locking means for movement to an unlocked position as the breakaway means is actuated by said force, resilient means connected to the locking means for moving the locking means to said unlocked position as the shearable element is sheared, whereupon the aft frame member responds to gravitational forces of a magnitude sufficient to separate from the second article and concurrently therewith pivotal disengagement of the hook means from the complementary means on the second article takes place.

8. An attach and release mechanism as claimed in claim 7, wherein said locking means includes a flat latch plate having an opening extending therethrough and a missile engaging hook element thereon and shear pin disposed within said opening and having a weakened portion thereon for maintaining the said missile engaging hook element in locking engagement with the second article until the shear pin shears at the weakened portion and the locking means is moved to said unlocked position.

9. An attach and release mechanism as claimed in claim 8 wherein said breakaway mechanism includes arm means engaging and supporting the shear pin means at one end thereof, said arm means being pivotally mounted at one end thereof and movable an amount sufficient to break the shear pin means at said weakened portion and withdraw the shear pin means from said opening in the latch plate in response to a force exerted at said other end thereof, and spring means operatively connected to the latch plate for moving said plate an amount sufficient to disengage the hook element from the second article.

References Cited in the file of this patent

UNITED STATES PATENTS

| | | |
|---|---|---|
| 2,776,622 | Robert | Jan. 8, 1957 |
| 2,787,218 | Anthony | Apr. 2, 1957 |
| 2,792,784 | Corrick et al. | May 21, 1957 |